United States Patent [19]

Brunner et al.

[11] Patent Number: 4,749,385
[45] Date of Patent: Jun. 7, 1988

[54] METHOD AND APPARATUS FOR PROVIDING CLEAN AIR

[75] Inventors: Glenn W. Brunner, Landisville; Samuel Pearlman, Lancaster, both of Pa.; Randall E. McCoy, Willingboro; Jordan R. Nelson, Pennington, both of N.J.

[73] Assignee: RCA Licensing Corporation, Princeton, N.J.

[21] Appl. No.: 30,638

[22] Filed: Mar. 27, 1987

[51] Int. Cl.⁴ .................................... B01D 46/10
[52] U.S. Cl. .................................... 55/97; 55/80; 55/267; 55/320; 55/332; 55/473; 55/DIG. 18
[58] Field of Search ............ 55/80, 97, 267, 320, 55/332, 467, 471, 473, DIG. 18

[56] References Cited

U.S. PATENT DOCUMENTS

| | | | |
|---|---|---|---|
| 2,415,621 | 2/1947 | Arnhym | 55/467 X |
| 2,540,695 | 2/1951 | Smith et al. | 55/332 |
| 2,628,083 | 2/1953 | Rense | 55/267 X |
| 3,273,323 | 9/1966 | Whitfield | 55/DIG. 18 |
| 3,998,142 | 12/1976 | Foreman et al. | 55/97 X |
| 4,016,809 | 4/1977 | Austin | 55/DIG. 18 |
| 4,098,174 | 7/1978 | Landy | 55/DIG. 18 |
| 4,175,934 | 11/1979 | Lang et al. | 55/267 |
| 4,191,543 | 3/1980 | Peters | 55/473 X |
| 4,530,272 | 7/1985 | Stokes | 55/97 X |
| 4,662,912 | 5/1987 | Perkins | 55/467 X |

FOREIGN PATENT DOCUMENTS

| | | | |
|---|---|---|---|
| 598338 | 5/1960 | Canada | 55/471 |
| 2657858 | 6/1978 | Fed. Rep. of Germany | 55/267 |
| 1362249 | 7/1974 | United Kingdom | 55/473 |

Primary Examiner—Robert Spitzer
Attorney, Agent, or Firm—E. M. Whitacre; D. H. Irlbeck; T. H. Magee

[57] ABSTRACT

A method of providing clean air to a workpiece comprises positioning the workpiece adjacent to a first opening in a conduit. The conduit includes a central segment and a peripheral segment having, respectively, the first opening and a second opening disposed at opposite ends of the conduit. The peripheral segment surrounds the central segment such that the first opening is substantially coplanar with the second opening. A laminar flow of air is created through the conduit in a direction away from the second opening and toward the first opening. The air flow is filtered through a HEPA filter supported within the conduit.

4 Claims, 1 Drawing Sheet

METHOD AND APPARATUS FOR PROVIDING CLEAN AIR

BACKGROUND OF THE INVENTION

This invention pertains to a method and apparatus for providing particle-free air to dry a workpiece.

In manufacturing a cathode-ray tube for use in color television, a panel assembly is formed which includes an apertured shadow mask mounted in a faceplate panel adjacent to a cathodoluminescent screen. The screen comprises a pattern of red, green and blue phosphors surrounded by a black matrix on the inside of the panel. Phosphor slurries and a black matrix application are deposited on the inner surface of the panel utilizing chemical photoresist processes which use photoresist films. In forming the black matrix, wet coatings are applied to the panel's inner surface at various process stations, and need to be effectively dried. In particular, the panel receives a photoresist application, a preparatory solution to assist in graphite adhesion, and an application of colloidal graphite.

In drying each of these applications, it is important to prevent airborne particulate from impinging on the wet coatings, since particles in the air, particularly those greater than 0.5 micrometer, cause defects in the matrix pattern such as white or black spots. Airborne debris has also been linked to sag defects in the matrix coating. Sag defects are ripples in the resist or graphite coating that cause areas of lightness or darkness to occur in the matrix coating.

A uniform drying pattern is also important since a nonuniform drying pattern alters the photosensitivity of the resist film. Nonuniform drying causes a nonuniform amount of water to remain in the photoresist film. The amount of water determines the hydrogen ion mobility which changes the photochemical reaction. When the photoresist film is too dry, the images produced are smaller than desired, thereby causing a reduction in the allowable tolerance.

Faceplate panels are currently dried by portable horizontal air blowers using High Efficiency Particulate Air (HEPA) filters. However, airborne particulate continues to causes a low yield, resulting in a large number of panels being rejected. More importantly, what is a low level problem in entertainment tubes becomes a critical problem in high-resolution display tubes. Significant capital resources would be required to remove airborne particulate from the whole process room. In order to avoid this additional cost, it is desirable to be able to effectively clean critical drying stations along the production line rather than to provide a particle-free environment for the entire room.

SUMMARY OF THE INVENTION

The present invention comprises a method and apparatus for providing clean air to a workpiece. The workpiece is positioned adjacent to a first opening in a conduit. The conduit includes a central segment and a peripheral segment having, respectively, the first opening and a second opening disposed at opposite ends of the conduit. The peripheral segment surrounds the central segment such that the first opening is substantially coplanar with the second opening. A laminar flow of air is created through the conduit in a direction away from the second opening and toward the first opening. The air flow is filtered through a HEPA filter supported within the conduit.

DETAILED DESCRIPTION OF THE PREFERRED EMBODIMENT

Figure 1:
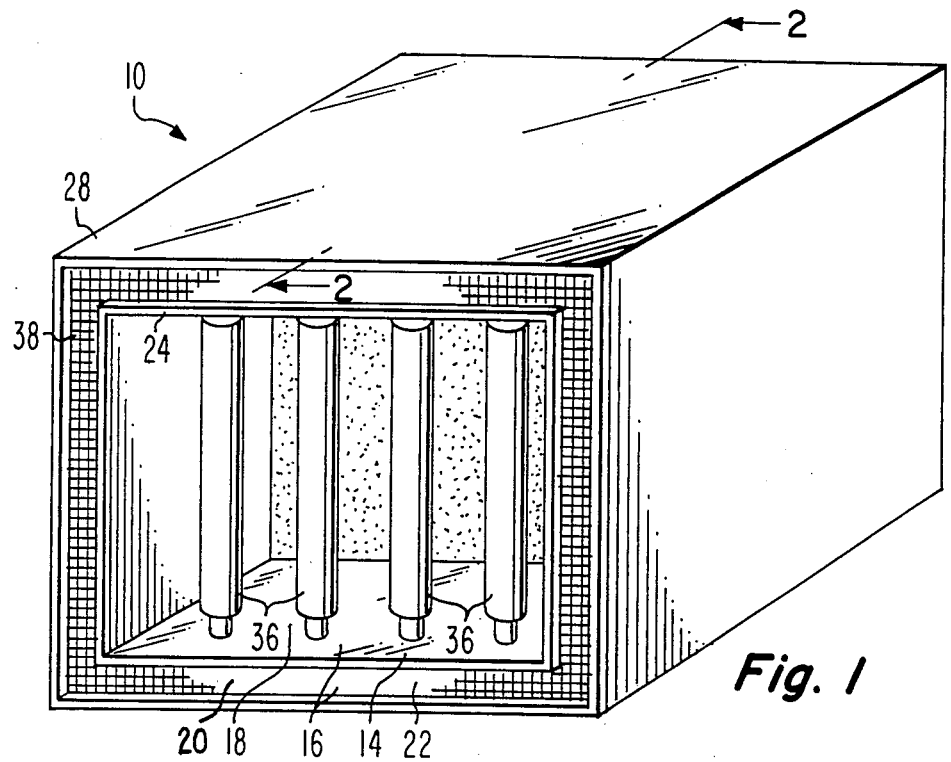
FIG. 1 is a perspective view of one embodiment of the present apparatus.
Figure 2:
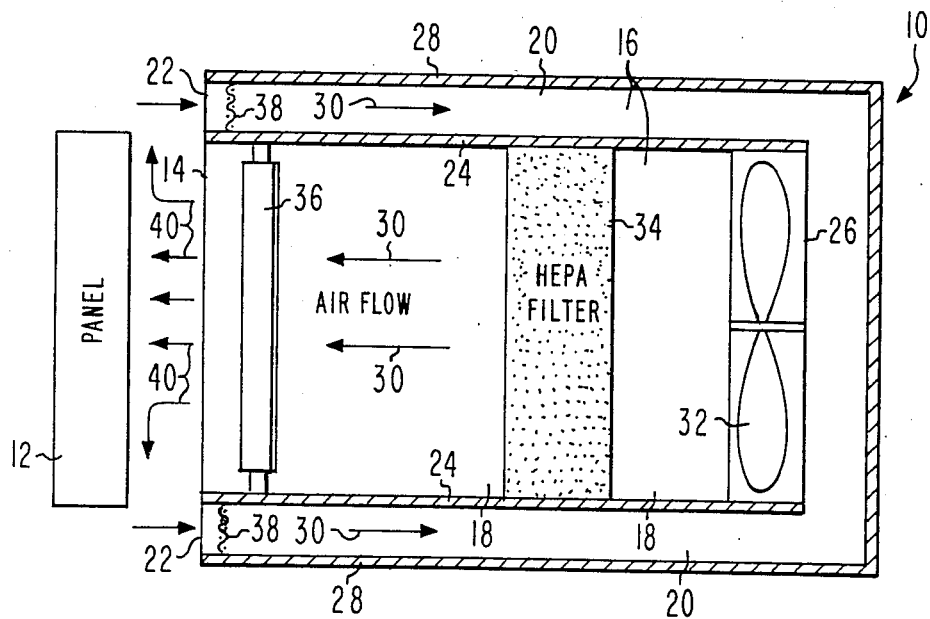
FIG. 2 is a cross-sectional view taken along line 2—2 of FIG. 1 illustrating diagrammatically the present method.

FIGS. 1 and 2 show an apparatus 10 for providing clean air to dry a faceplate panel 12. The panel is positioned adjacent to a first opening 14 in a conduit 16 in the apparatus 10, as shown in FIG. 2. The conduit 16 includes a central segment 18 and a peripheral segment 20 having, respectively, the first opening 14 and a second opening 22 disposed at opposite ends of the conduit 16. The peripheral segment 20 surrounds the central segment 18 such that the first opening 14 is substantially coplanar with the second opening 22. In the present embodiment, the conduit 16 comprises a first boxlike structure 24 having the first opening 14 at one end thereof and a connecting opening 26 at the end opposite the one end to form the central segment 18. The first structure 24 is disposed within a second boxlike structure 28, which is larger than the first structure 24 and open at one end thereof, to form the peripheral segment 20 such that the peripheral segment 20 communicates with the central segment 18 through the connecting opening 26, as shown in FIG. 2.

Means are disposed in the conduit 16 for creating a laminar flow of air therethrough in a direction away from the second opening 22 and toward the first opening 14, as shown by arrows 30 in FIG. 2. In the present example, the laminar flow creating means comprises a fan 32, such as an air conditioning fan, which is supported by the first boxlike structure 24 adjacent to the connecting opening 26. Also, means are supported within the conduit 16 for filtering the air flow. Preferably, the filtering means comprises a High Efficiency Particulate Air (HEPA) filter 34 supported within the first boxlike structure 24. For purposes of providing clean air to the wet faceplate panel 12, the HEPA filter 34 should remove airborne particles having a diameter greater than 0.5 micrometer.

In order to optimize the drying of wet surfaces, the apparatus 10 further comprises means supported within the central segment 18 for heating the air flow. The heating means comprises a plurality of infrared heaters 36 positioned near the first opening 14, as shown in FIG. 1. The apparatus 10 also has a wire mesh screen 38 disposed across the peripheral segment 20, adjacent the second opening 22, in order to prevent large airborne debris from entering the conduit 16.

The portable horizontal air blowers in current use do not effectively prevent airborne particulate from causing defects in the matrix pattern on the panel 12. Applicants have determined that this detrimental particulate comes from dirty ambient air which has not passed through the HEPA filter. Currently, air for drying the panel 12 comes not only from air received directly from the blower but also from entrained air due to the Venturi action of the blower. The entrained air is not filtered. Consequently, airborne particulate impinges on the wet coating of the panel 12, be it photoresist, colloidal graphite or phosphor slurry, resulting in defects.

In the present method, the faceplate panel 12 is moved along a production line to a clean-air drying station having the present apparatus 10. The line is stopped when the panel 12 is positioned adjacent to the first opening 14 in the conduit 16 such that the panel 12 is approximately five inches from the first opening 14. The dimensions of the first opening 14 should be similar to that of the panel 12. The fan 32 creates a laminar flow of air through the conduit 16 which passes through the first opening 14 and impinges on the panel 12. This laminar air flow moves across the surface of the panel 12 radially outward from the center to the edge, as shown by arrows 40 in FIG. 2. However, at the edge of the panel 12, a substantial portion of this air reenters the conduit 16 through the surrounding second opening 22, along with a small amount of ambient air. This return air flow creates a peripheral blanket around the central air flow impinging on the panel, and prevents the dirty ambient air from reaching the wet coating on the panel 12. In other words, the unfiltered air entrained from the ambient air is drawn into the air inlet of the present apparatus via the surrounding second opening 22, where it can then be passed through the HEPA filter 34 before impinging on the panel 12.

The effectiveness of using the present apparatus 10 as a clean-air drying station is shown in the table below. A Hiac/Royco Particle Counter, model 247, tested the air quality twelve inches in front of this apparatus 10 in a factory matrix room. This unit is capable of accurately measuring the number of particles in the air above 0.5 micrometer at very high particle levels. The accumulation channels selected were the total number of particles above 0.5 micrometer and above 5 micrometers.

TABLE

|  | PARTICLE SIZE | |
| --- | --- | --- |
|  | >0.5 μm | >5 μm |
| COUNT WITH FAN OFF | 6,200 | 30 |
| COUNT WITH FAN ON | 0 | 0 |

With the fan 32 off, the count was 6,200 particles above 0.5 micrometer and 30 particles above 5 micrometers. However, with the fan 32 on, the count was 0 for all particles above 0.5 micrometer, showing a dramatic decrease in airborne particles. Even tearing paper above the unit failed to affect the cleaning action of the present apparatus 10.

The present portable apparatus 10 provides for an effective clean-air drying station which thoroughly cleans the area at critical drying locations along the production line, thereby achieving a system which is significantly more cost-effective than providing a particle-free environment for the entire room. The present design of the apparatus 10 optimizes the drying of a wet surface, particularly a photoresist film, in that the laminar air flow provides clean air across the wet surface of the photoresist in such a manner as to provide the correct vectorial additions, thereby achieving a more uniform drying pattern. Since the bulk of the clean air is recycled, the resulting decrease in load on the HEPA filter increases its life expectancy, thereby reducing the number of filters used. Also, the recycling of heated air represents an additional cost saving in energy requirements.

What is claimed is:

1. A method of providing clean air to a workpiece comprising the steps of:
    positioning said workpiece adjacent to a first opening in a conduit including a central segment and a peripheral segment having, respectively, said first opening and a second opening disposed at opposite ends of said conduit, such that said first opening is substantially coplanar with said second opening, the dimensions of said first opening being similar to that of said workpiece;
    creating a laminar flow of air through said conduit in a direction away from said second opening and toward said first opening; and
    filtering said air flow.

2. A method as recited in claim 1 wherein said conduit comprises a first boxlike structure having said first opening at one end thereof and a connecting opening at the end opposite said one end to form said central segment, said first structure being disposed within a second boxlike structure, larger than said first structure and open at one end thereof, to form said peripheral segment such that said peripheral segment communicates with said central segment through said connecting opening.

3. A method as recited in claim 2 wherein said laminar flow creating step is performed by operating a fan supported by said first boxlike structure adjacent to said connecting opening.

4. A method as recited in claim 2 wherein said filtering step is performed by placing a High-Efficiency Processed Air (HEPA) filter within said first boxlike structure.

* * * * *